Sept. 26, 1933.   N. A. WAHLBERG   1,927,907
CURRENT COLLECTOR SUPPORT
Filed March 19, 1932   3 Sheets-Sheet 1
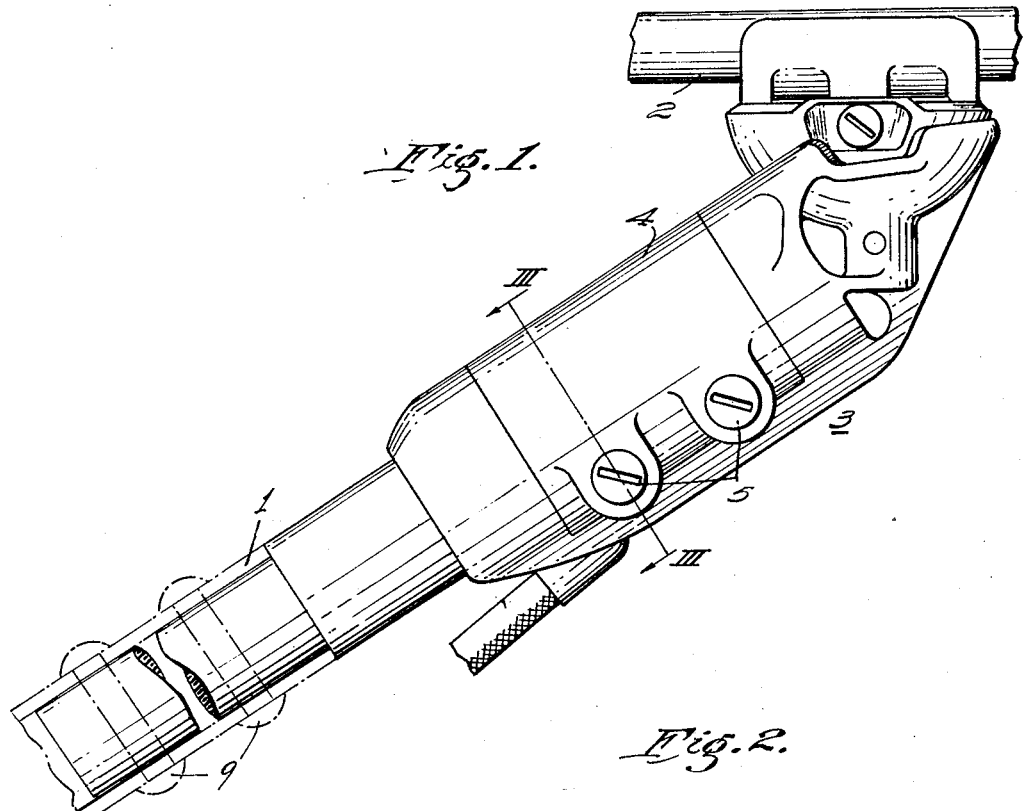
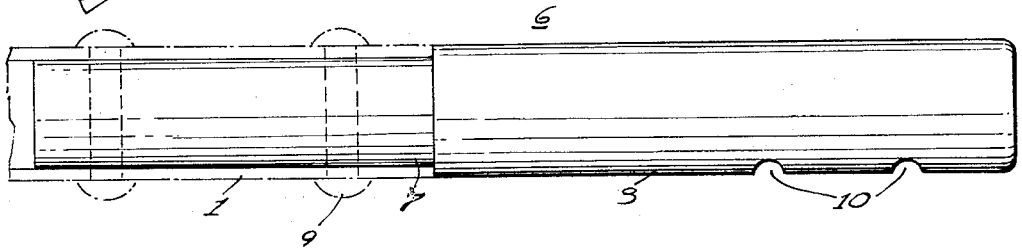
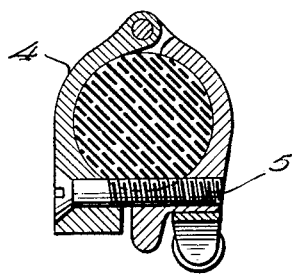
INVENTOR
Nils A. Wahlberg,
BY
ATTORNEY
WITNESSES:

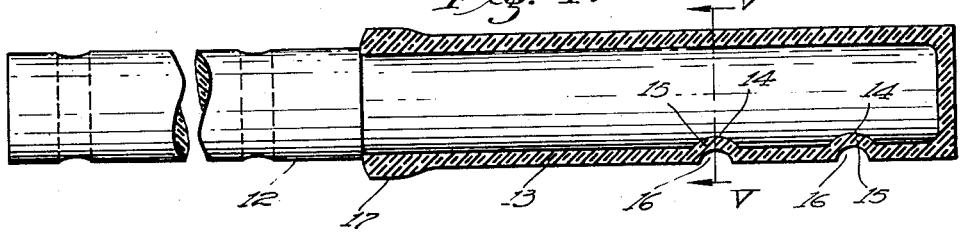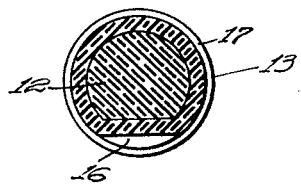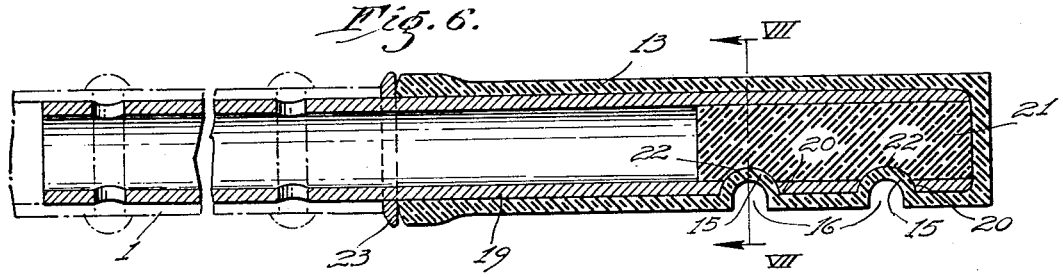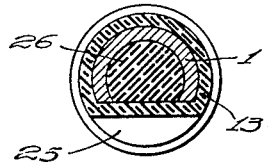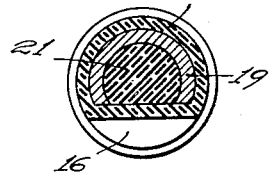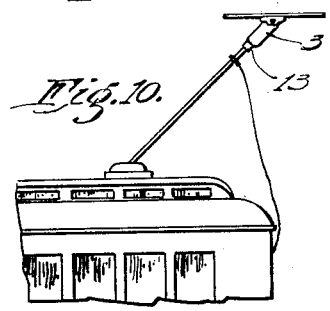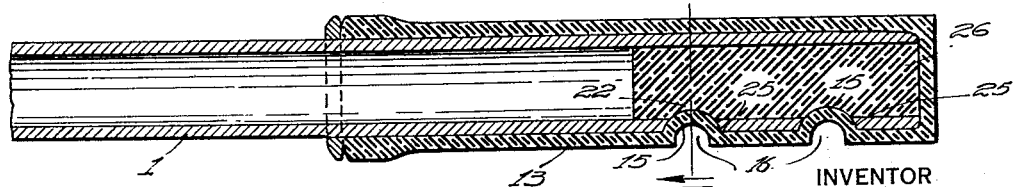

Sept. 26, 1933.  N. A. WAHLBERG  1,927,907
CURRENT COLLECTOR SUPPORT
Filed March 19, 1932  3 Sheets-Sheet 3

WITNESSES:
E. C. Liding
R R Lockwood

INVENTOR
Nils A. Wahlberg.
BY
M. Crawford
ATTORNEY

Patented Sept. 26, 1933

1,927,907

UNITED STATES PATENT OFFICE 1,927,907

CURRENT COLLECTOR SUPPORT

Nils A. Wahlberg, Wilkinsburg, Pa., assignor to Westinghouse Electric & Manufacturing Company, a corporation of Pennsylvania Application March 19, 1932. Serial No. 599,949

9 Claims. (Cl. 191—64)

My invention relates, generally, to current collectors and it has particular relation to current collectors for electric vehicles.

In my copending application, Serial No. 498,413, filed November 26, 1930, and assigned to Westinghouse Electric & Manufacturing Company, I have disclosed a device for collecting current from a trolley conductor which comprises a current collector mounted on a trolley pole and supported and insulated therefrom by a pole extension or tube which has vulcanized or molded thereon a rubber sleeve. The current collector is secured to the sleeve which serves as the insulating member.

When the insulating member becomes worn or unsatisfactory for further use, it is desirable to renew the insulating member with a minimum of expense for labor and material.

Therefore, the object of my invention, generally stated, is to provide a support and insulator for a current collector which shall be simple, safe and efficient in operation and which may be readily and economically manufactured, installed and replaced.

A more specific object of my invention is to provide for readily renewing the insulation interposed between a current collector and the trolley pole upon which the current collector is mounted.

Another object of my invention is to provide an insulating support member for a current collector which also functions to prevent sound vibrations from being transmitted from the current collector to the body of the vehicle upon which it is mounted.

Other objects of my invention will, in part, be obvious and, in part, appear hereinafter.

My invention, accordingly, is disclosed in the embodiment hereof shown in the accompanying drawings, and comprises the features of construction, combination of elements and arrangement of parts which will be exemplified in the construction hereinafter set forth, and the scope of the application of which will be indicated in the appended claims.

For a more complete understanding of the nature and scope of my invention, reference may be had to the following detailed description taken in conjunction with the accompanying drawings, in which Figure 1 is a side elevational view of a current collector supported on a trolley pole by a replaceable insulating member in accordance with my invention.

Fig. 2 is a view showing in detail the insulating member used for supporting the current collector in Fig. 1.

Fig. 3 is a sectional view taken along the line III—III of Fig. 1.

Fig. 4 is a view, partly in side elevation and partly in section, showing a modification of the insulating member shown in Fig. 2.

Fig. 5 is a sectional view taken along the line V—V of Fig. 4.

Fig. 6 is a sectional view showing a further modification of the insulating member shown in Fig. 2.

Fig. 7 is a sectional view taken along the line VII—VII of Fig. 6.

Fig. 8 is a sectional view of the upper end of a trolley pole showing a removable insulating sleeve mounted directly on this portion of the trolley pole.

Fig. 9 is a sectional view taken along the line IX—IX of Fig. 8.

Fig. 10 is a view showing the application of the insulating member shown in Fig. 8 to a trolley pole mounted on an electric vehicle.

Figure 11:
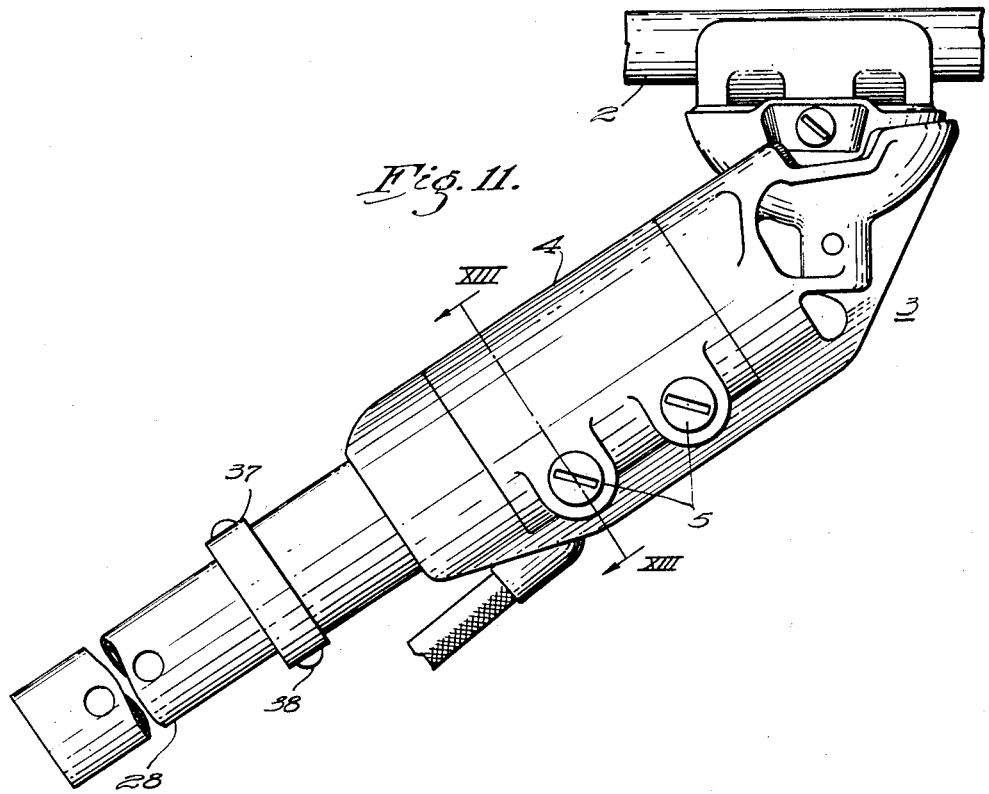
Fig. 11 is a view in side elevation showing a further modification of the insulating member shown in Fig. 2.

Referring now to Figs. 1, 2 and 3 of the drawings, 1 designates a tubular trolley pole which may be supported in any suitable manner from an electric vehicle. In order to collect current from an overhead trolley conductor 2 a current collector shown generally at 3 is provided which may be of any suitable construction and will not be described in detail in this specification.

The current collector 3 is provided with a hinged clamp 4 which is secured in position by means of screws 5 which serve the function of ribs as will be described hereinafter.

In order to support and insulate the current collector 3 from the trolley pole 1, a solid insulating member shown generally at 6 is provided having a reduced portion 7 for fitting within the upper end of the tubular trolley pole 1 and a main portion 8 upon which the current collector 3 may be mounted. The insulating member 6 may be composed of any suitable material such as laminated wood or a compound of rubber which has sufficient strength to support the current collector 3 under operating conditions. The insulating member 6 is preferably secured to the trolley pole 1 by means of bolts or rivets 9, which may be readily removed to permit the replacement of the insulating member.

While the clamping action of the hinge member 4 serves to assist in maintaining the current collector 3 in the desired position on the insulating member 6, it is desirable to provide additional means for insuring against relative longitudinal and rotative movement of the current collector 3 with respect to the insulating member 6. Therefore, grooves 10 are provided near the upper end of the insulating member 6 with which the screws 5 are disposed to engage. As shown more clearly in Fig. 3, the screws 5 serve the purpose of transverse ribs extending inwardly from the current collector and engage the grooves 10 in the insulating member 6.

It will be readily apparent that this arrangement of the screws 5 and the grooves 10 secures the current collector 3 from either longitudinal or rotative movement with respect to the insulating member 6 and that it is not necessary to secure all of the holding action by means of the clamping member 4. It will be observed that this arrangement, for preventing relative longitudinal and rotative movement, permits the use of a light weight design of parts for the current collector 3, since the hinge member 4 need not be so tightly pressed against the insulating member 6 as would otherwise be necessary if transverse ribs and grooves were not used.

In the modification shown in Figs. 4 and 5 of the drawings it is contemplated to use an insulating member or plug 12 which is provided with a tubular rubber sleeve 13 instead of the single insulating member 6 described hereinbefore. The plug 12 may be secured within the upper end of the trolley pole 1, as set forth hereinbefore, while its upper end is slightly recessed to provide for the application of the rubber sleeve 13 and still maintain the same outside diameter upon which the current collector 3 may be mounted.

In order to prevent longitudinal and rotative movement of the sleeve 13, with respect to the plug 12 and further to prevent a similar movement between the current collector 3 and the sleeve 13, transversely extending grooves 14 are provided near the upper end of the plug 12 as shown, while transversely inwardly extending ribs 15 are formed integrally with the sleeve 13, as shown, for engaging the grooves 14, and, in addition, transverse grooves 16 are provided in the sleeve 13 disposed to engage with the screws 5 of the current collector. The grooves 16 are symmetrical with respect to the ribs 15. Therefore, a substantially uniform thickness of material is maintained, and, in addition, a minimum amount of space is required.

The sleeve 13 may be readily applied by inserting the plug 12 therein and forcing it into the position shown in Fig. 4 of the drawings. In the event it is desired to remove the sleeve 13, it is merely necessary to exert sufficient force on the sleeve to cause the ribs 15 to become disengaged from the grooves 14, whereupon the sleeve may be readily removed and a new one placed in position.

It will be observed that the sleeve 13 is completely closed at one end. However, it will be apparent that the sleeve may also be formed with an opening at this end if it is so desired in order to conserve material or for any other desired purpose.

In order to resist excessive wear which may be applied to the lower end of the sleeve 13, this portion thereof is provided with a larger cross-sectional area as at 17. This formation of the lower end of the sleeve 13 permits the use of the sleeve for longer periods without the necessity arising for replacing it because of the lower end of the sleeve becoming broken from engagement with the overhead trolley construction when a dewirement of the current collector 3 occurs.

The insulating device shown in Figs. 6 and 7, of the drawings, comprises the insulating sleeve 13, described hereinbefore, which may be mounted on a tubular pole extension 19 adapted for mounting upon the upper end of the trolley pole 1 in a manner similar to the mounting of the insulating member 6 as described hereinbefore. The pole extension 19 is provided with transversely extending grooves 20 with which the ribs 15 of the sleeve 13 are disposed to engage.

With a view to reinforcing the ribs 15 an insulating plug 21 of any suitable insulating material such as wood or rubber is inserted within the upper end of the pole extension 19 and is provided with grooves 22 as shown for engaging the ribs 15. It will also be apparent that the insertion of the plug 21 improves the insulating characteristics of the sleeve 13 for the reason that a breakdown is less likely to occur when the ribs 15 are supported as set forth.

In order to protect the sleeve 13 from being damaged in the event that the current collector is dewired, a metallic washer 23 is provided at its lower end, as shown, and is secured to the pole extension 19 by any suitable means such as by welding.

Since the insulating sleeve 13 may be readily removed from the pole extension 19, it will be apparent that the extension may be dispensed with and the sleeve 13 mounted directly on the end of the trolley pole 1 without the interposition of any additional member as shown in Fig. 8. The upper end of the trolley pole 1 is provided with suitable transversely-extending grooves 25. In addition, a plug 26 may be inserted in the upper end thereof similar to the plug 21 described in connection with the modification shown in Fig. 6.

In the event that the sleeve 13 is so badly damaged that it is necessary to replace it, it is only necessary to remove the current collector 3 and pull the sleeve 13 from the end of the pole and replace it with a new one. It will, therefore, be apparent that it is not necessary to remove rivets, bolts or fastening members of any kind to replace the insulating member nor is it necessary to discard any additional piece of equipment other than the worn or damaged insulating sleeve 13.

Figure 12:
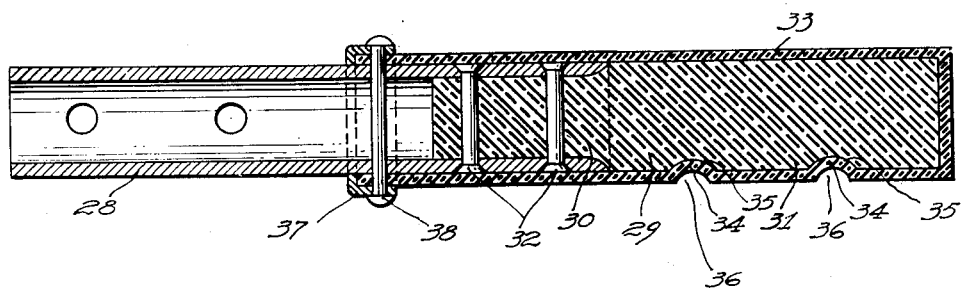
Fig. 12 is a sectional view showing in detail the insulating member shown in Fig. 11.
Figure 13:
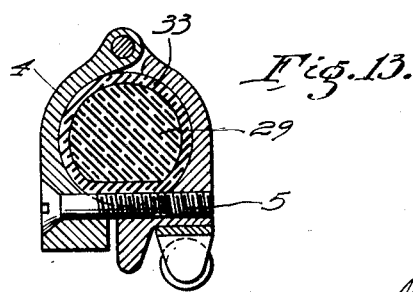
Fig. 13 is a sectional view taken along the line XIII—XIII of Fig. 11.

With a view to further increasing the insulation characteristics of the members supporting the current collector 3 from the trolley pole 1, the arrangement shown in Figs. 11, 12 and 13 is provided. A tubular metallic pole extension 28 is provided for attachment to the upper end of the trolley pole. An insulating plug 29 of any suitable material such as wood or rubber is provided having a recessed portion 30 for insertion within the upper end of the pole extension 28 and a main portion 31 of the same diameter as the external diameter of the pole extension 28. The plug 29 may be secured to the pole extension 28 by any suitable means such as the rivets 32, the heads of which are countersunk into the surface of the pole extension.

An insulating tube 33 composed of soft rubber is placed over the plug 29 and the upper end of the pole extension 28, as shown. In order to prevent relative longitudinal and rotative movement, the sleeve 33 is provided with ribs 34 which are arranged to engage transverse grooves 35 in the plug 29.

In order to secure the current collector 3 against relative longitudinal and rotative movement transverse grooves 36 are provided in the sleeve 33 in conjunction with the ribs 35, as illustrated, and are arranged to be engaged by the screws 5 of the current collector 3, as described hereinbefore.

With a view to protecting the lower end of the sleeve 33 from being torn or otherwise damaged on engagement with the overhead trolley system, a ferrule 37 is provided, as shown, and is secured to the extension 28 by means of a rivet 38.

It will be readily apparent that this arrangement of supporting members for the current collector 3 provides a considerable amount of insulation between the current collector and the metallic supporting structure and thereby lessening the likelihood of an insulation breakdown between these members.

Since further changes may be made in the above construction and different embodiments of the invention may be made without departing from the scope thereof, it is intended that all matter contained in the above description and shown in the accompanying drawings shall be interpreted as illustrative and not in a limiting sense.

I claim as my invention:

1. In a device for collecting current from a trolley conductor for an electric vehicle, in combination, a tubular-metallic trolley pole disposed to be carried by the vehicle, a solid insulating plug provided with a reduced portion for mounting within the upper end of the pole, removable means extending transversely through the pole and the plug for securing the plug to the pole, and a current collector carried by the plug and secured thereto against relative longitudinal and rotative movement.

2. A device for collecting current from a trolley conductor for an electric vehicle comprising, in combination, a tubular-metallic trolley pole disposed to be carried by the vehicle, a solid insulating plug removably secured within the upper end of the pole and extending axially therefrom, and a current collector removably mounted on the exposed end of the plug and at a predetermined distance from the pole, said plug and collector being respectively provided with mutually-engaging transversely-extending grooves and removable holding members to prevent relative longitudinal and rotative movement.

3. A device for supporting and insulating a current collector from a tubular trolley pole comprising a single solid integral member of insulating material provided with a reduced portion for mounting within the pole and transversely-extending openings in said recessed portion to permit the insertion of holding members, said member having enlarged cylindrical portion for carrying the collector and having in the surface a plurality of straight transversely extending grooves for engaging holding members included in the collector.

4. In a device for collecting current from a trolley conductor for an electric vehicle, in combination, a tubular-metallic trolley pole disposed to be carried by the vehicle, a solid insulating plug removably secured within the upper end of the pole, a soft rubber sleeve removably mounted on the plug, said plug and sleeve being provided with mutually-engaging transversely-extending grooves and ribs to prevent relative longitudinal and rotative movement, and a current collector mounted on the soft rubber sleeve and detachably secured thereto for engaging the trolley conductor.

5. In a device for collecting current from a trolley conductor for an electric vehicle, in combination, a trolley pole disposed to be carried by the vehicle, an insulating plug removably secured to the trolley pole and extending therefrom, a soft rubber sleeve removably mounted on the plug, said plug and sleeve being respectively provided with mutually-engaging transversely-extending grooves and ribs to prevent relative longitudinal and rotative movement, and a current collector mounted on the sleeve covered portion of the plug for engaging the trolley conductor, the current collector and the sleeve being respectively provided with mutually-engaging transversely-extending ribs and grooves to prevent relative longitudinal and rotative movement of the current collector with respect to the trolley pole.

6. In a device for collecting current from a trolley conductor for an electric vehicle, in combination, a trolley pole disposed to be carried by the vehicle, a tubular metallic support member mounted on the upper end of the trolley pole, said support member being provided with transversely-extending spaced grooves, an insulating plug within the support member provided with grooves coextensive with the grooves in the support member, a soft rubber sleeve removably disposed on the support member and provided with inwardly-extending transverse ribs for engaging the grooves in the support member and the plug, and a current collector detachably secured to the sleeve for engaging the conductor.

7. A device for insulating and supporting a current collector from a trolley pole comprising, in combination, a tubular metallic support member disposed to be carried by the trolley pole, a plug of insulating material disposed within the upper end of the support member, a soft rubber sleeve covering the end of the support member containing the plug and extending along the support member, said support member, plug and sleeve being provided with mutually-engaging transversely-extending grooves and ribs to prevent relative longitudinal and rotative movement, said sleeve also being provided with transversely-extending grooves for engagement with corresponding ribs of the current collector.

8. In a device for collecting current from a trolley conductor for an electric vehicle, in combination, a tubular-metallic support member disposed to be mounted in the upper end of a trolley pole carried by the vehicle, an insulating plug having a main portion of the same diameter as the support member and a reduced portion to permit the mounting thereof within the support member, transversely-extending means for securing the plug to the support member, a tubular sleeve of soft rubber disposed to completely enclose the main portion of the plug and a portion of the supporting member, the main portion of the plug and the tubular sleeve being provided with mutually-engaging transversely extending-grooves and ribs to prevent relative longitudinal and rotative movement, and a current collector detachably secured to the sleeve for engaging the trolley conductor.

9. A device for insulating and supporting a current collector from a trolley pole comprising, in combination, a tubular-metallic support member disposed to be carried by the trolley pole, an insulating plug having a main portion of the same diameter as the support member and a reduced portion to permit the mounting thereof within the support member, retaining means extending transversely through the support member and the plug, a removable tubular sleeve of soft rubber disposed to completely enclose the main portion of the plug and a portion of the support member, the main portion of the plug and the sleeve being provided with mutually-engaging transversely-extending grooves and ribs to prevent relative longitudinal and rotative movement, said sleeve also being provided with transversely-extending grooves to provide for engagement with corresponding ribs on the current collector, and a ferrule surrounding the support member and the lower end of the sleeve to secure the lower end of the sleeve in position.

NILS A. WAHLBERG.